United States Patent
Norman et al.

(10) Patent No.: US 7,422,245 B2
(45) Date of Patent: Sep. 9, 2008

(54) ASSEMBLY FOR ATTACHING A CLAMP TO A HOSE

(75) Inventors: Andrew Norman, Paris, TN (US); Ben F. Holt, Lexington, TN (US)

(73) Assignee: Fluid Routing Solutions, Inc., Rochester Hills, MI (US)

( * ) Notice: Subject to any disclaimer, the term of this patent is extended or adjusted under 35 U.S.C. 154(b) by 0 days.

(21) Appl. No.: 11/285,687

(22) Filed: Nov. 22, 2005

(65) Prior Publication Data

US 2007/0114792 A1    May 24, 2007

(51) Int. Cl.
 B65D 57/00    (2006.01)
 F16L 57/00    (2006.01)
 A44B 11/25    (2006.01)

(52) U.S. Cl. .......... 285/23; 285/252; 285/253; 24/274 R; 24/279; 24/304

(58) Field of Classification Search ........... 24/274 R, 24/279, 304; 285/23, 253, 252
See application file for complete search history.

(56) References Cited

U.S. PATENT DOCUMENTS 3,279,014 A * 10/1966 Fischer ............... 24/115 R
3,365,218 A    1/1968  Denyes
4,151,926 A *  5/1979  Kinney et al. ........... 220/3.94
4,197,620 A *  4/1980  Heuchert ............... 24/274 R
5,185,913 A    2/1993  Campo et al.
5,456,784 A   10/1995  Cogdill et al.
6,773,037 B2   8/2004  Spurgat
2005/0052020 A1 * 3/2005 Butler .................. 285/23

FOREIGN PATENT DOCUMENTS

WO    WO 02/42675    5/2005

* cited by examiner

Primary Examiner—Robert J Sandy
Assistant Examiner—Jay R Ripley
(74) Attorney, Agent, or Firm—Joseph V. Tassone; Thompson Hine LLP

(57) ABSTRACT

An assembly is provided for attaching a clamp to a hose. The assembly includes a hose, a clamp, a cover bracket and an adhesive. The clamp includes a band and a screw housing mounted to the band with a screw disposed in the screw housing. The screw engages the band to tighten the band and draw the band around the hose. The cover bracket has an opening for receiving the screw housing. The cover bracket includes a cover portion for the screw housing and a base portion extending from the cover portion. The base portion includes a bonding surface for attaching the cover bracket to the hose and a channel located between the bonding surface and the band. The adhesive is applied to the bonding surface such that the cover bracket is adhered to the hose without interfering with the clamp operation.

15 Claims, 2 Drawing Sheets

ASSEMBLY FOR ATTACHING A CLAMP TO A HOSE

BACKGROUND OF THE INVENTION

The present invention relates generally to an assembly that includes a fastener for attaching a clamp to a hose.

In an effort to reduce cost and improve manufacturing efficiency, automotive OEM customers are asking suppliers to provide assemblies containing multiple components. These requests eliminate packaging and simplify handling requirements for the OEM customer, thus reducing costs and improving manufacturing efficiency. One common request is to attach pre-positioned clamps to fuel fill hoses. This allows a single operator to install a relatively large assembly. In addition, where space limitations exist, the inclusion of pre-attached, pre-position clamps eliminates the need for the operator to hold the clamp in place during installation. This is particularly helpful in instances in which it is not practical for the operator to hold the clamp due to space constraints.

Current methods for attaching clamps include directly bonding the clamp to the hose using an appropriate adhesive, a tape, a mechanical clip, a rivet, a vulcanized material patch, or a plastic housing, see, for example, WO 02/42675. U.S. Pat. No. 5,456,784 to Cogdill et al. discloses a tubular arrangement of elastic material for securing a clamping means to the end of a hose. U.S. Pat. No. 5,185,913 to Campo et al. discloses a fastening member having recesses therein for holding a clamp on the end of a hose. U.S. Pat. No. 3,365,218 to Denyes discloses various means for fastening a clamping member to a hose. Each of the foregoing approaches has advantages and disadvantages. For example, direct bonding, tape, and the use of a vulcanized patch are susceptible to oil and other contaminants and can result in sporadic performance problems. The rivet and mechanical clip attachments have raised concerns related to connection integrity and emission levels. Specifically, contamination of the screw mechanism with misplaced or excess adhesive may lead to a false installation force, e.g., the installer believes that the hose is more tightly installed than it actually is, due to the turning force required to overcome any interference created by the adhesive.

SUMMARY OF THE INVENTION

An assembly is provided for attaching a clamp to a hose. The assembly includes a hose, a clamp, a cover bracket and an adhesive. The clamp includes a band and a screw housing mounted to the band with a screw disposed in the screw housing. The screw engages the band to tighten the band and draw the band around the hose. The cover bracket has an opening for receiving the screw housing. The cover bracket includes a cover portion for the screw housing and a base portion extending from the cover portion. The base portion includes a bonding surface for attaching the cover bracket to the hose and a channel located between the bonding surface and the band. The adhesive is applied to the bonding surface such that the cover bracket is adhered to the hose without interfering with the clamp operation.

BRIEF DESCRIPTION OF THE DRAWINGS

The objects, features and advantages of the invention will appear more fully hereinafter as the description thereof proceeds, reference being made to the accompanying drawings in which.

DETAILED DESCRIPTION OF THE INVENTION

Figure 1:
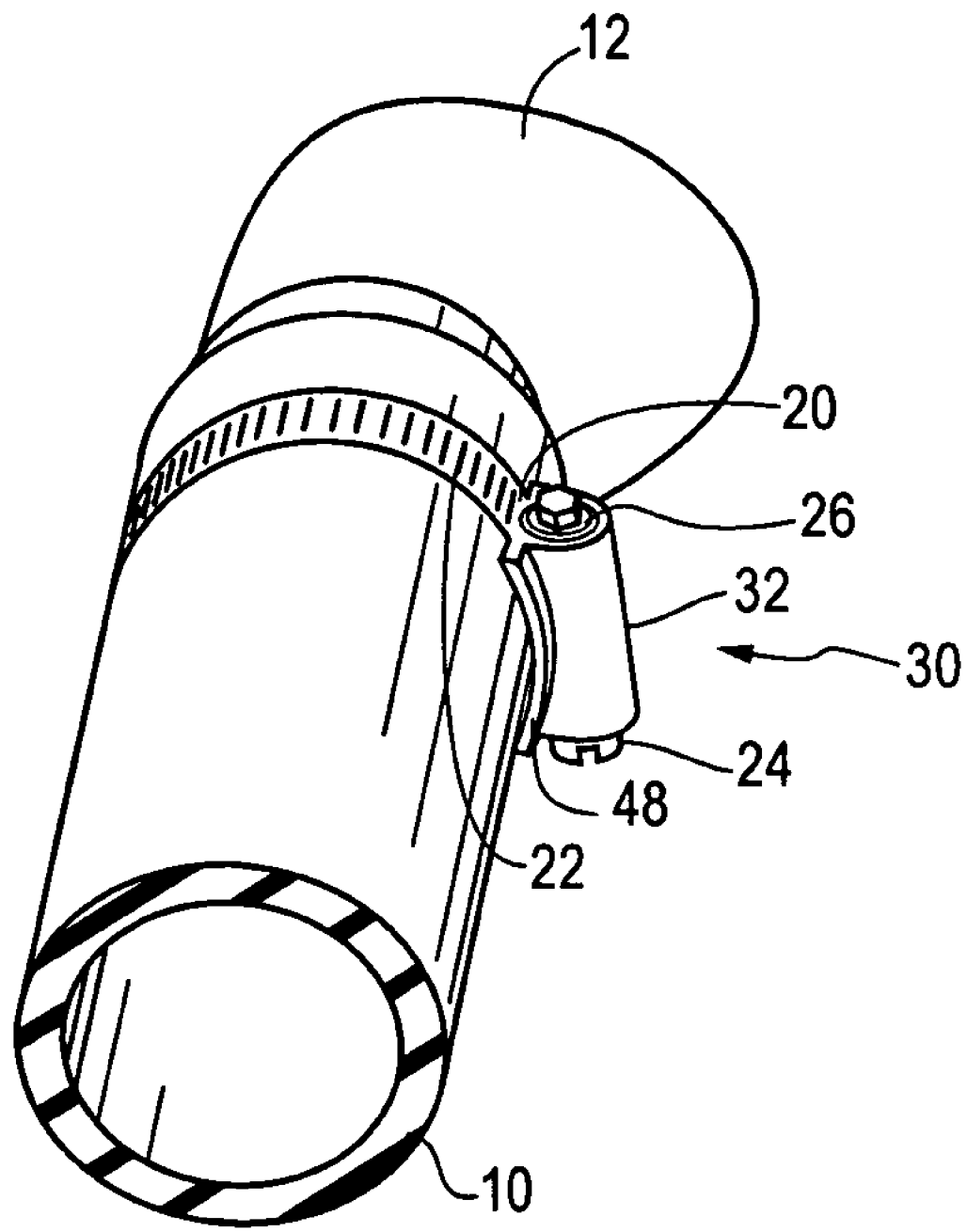
FIG. 1 illustrates a perspective view of a bracket in accordance with one embodiment of the invention assembled with the hose.

Referring now to the drawings, in particular FIG. 1, there is illustrated by way of example a conventional automotive hose 10 including a screw clamp mechanism 20. FIG. 1 illustrates a cover bracket 30 in accordance with one embodiment of the present invention in place over the clamp 20. More specifically, the clamp 20 includes a slotted band 22, a screw 24 and a screw housing 26. As the screw 24 is turned, the threads of the screw 24 engage the slots 28 on the band 22 of the clamp 20. This draws the band 22 around the hose 10 thereby tightening the hose onto a fixture 12 to which the hose is mounted.

The cover bracket 30 includes a cover portion 32. The cover portion 32 is illustrated in this embodiment as being substantially U-shaped; however, those skilled in the art will recognize that the cover portion 32 can be any shape that captures and contains the screw housing 26. For example, the cover portion 32 could be rectangular, semicircular or polygonal.

Figure 2:
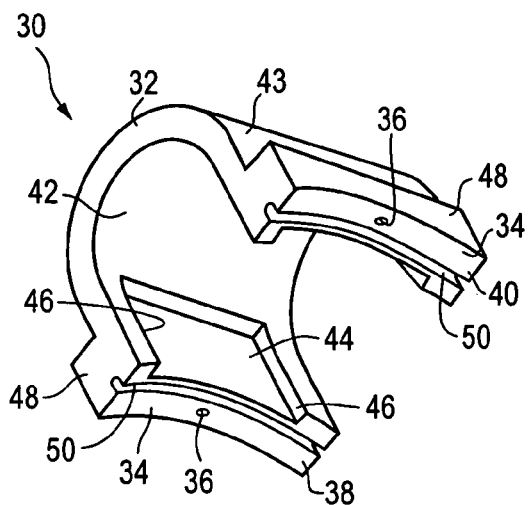
FIG. 2 illustrates a perspective view of a bracket in accordance with one embodiment of the invention prior to assembly with the hose.
Figure 3:
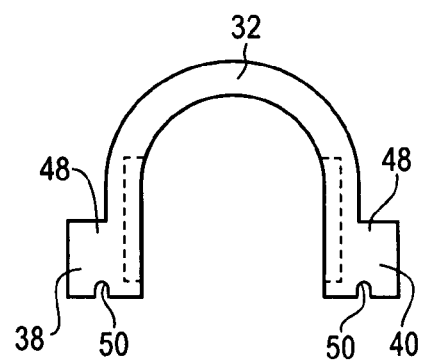
FIG. 3 illustrates a cross section of the bracket of FIG. 2.

Referring now to FIGS. 2 and 3, in one embodiment, the cover portion 32 includes inside surface 42 with a set-in portion 44. This set-in portion may be sized and shaped to contain the screw housing 26. As a result of forming the set-in portion 44 in the sidewalls 43, a stop 46 is formed on the inside of the front and back walls of the cover portion 32 which prevents the screw housing from moving inside the cover bracket 30. In this manner upon turning the screw 24, as a result of the detents of stops 46, the band is drawn through the screw housing 26 and the screw housing 26 does not move with respect to the cover bracket 30.

A base portion 48 including a bonding surface 34 extends from the cover portion 32. A deposit of an adhesive 36 is provided on the bonding surface 34 for securing the cover bracket 30 to the hose 10 as shown in FIG. 2. In this embodiment, the bonding surface is formed on two runners 38 and 40 which are spaced apart a distance that is approximately equal to the width of the band 22. Each runner may include a channel 50 located between the bonding surface 34 and the band. The channel 50 may be substantially parallel and proximate to the band. When the bonding surface is adhered to the hose, excess adhesive 36 may flow into the channels 50 rather than contaminating the screw 24 or the screw housing 26. In one embodiment, the channels 50 run the full length of the runners, such that if the adhesive 36 fills the channels 50, the excess adhesive is directed out the open ends of the channels 50 parallel to the band and distal from the screw mechanism.

Figure 4:
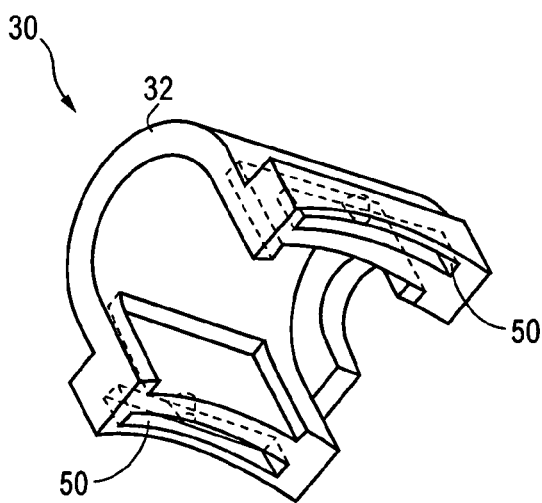
FIG. 4 illustrates a perspective view a bracket in accordance with a second embodiment of the invention prior to assembly with the hose.
Figure 5:
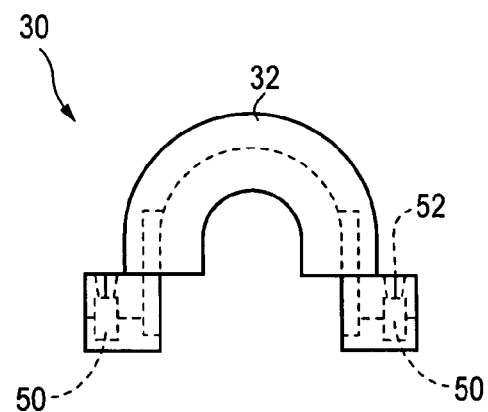
FIG. 5 illustrates a cross section of the bracket of FIG. 4.

Referring now to FIGS. 4 and 5, the channels 50 may also include an aperture 52. If the channels 50 fill with adhesive, the adhesive is directed through the aperture 52 to the exterior of the cover bracket 30 and away from the screw 24 and the screw housing 26. The aperture 52 may be tapered in shape, such that the diameter of the aperture 52 at the exterior of the cover bracket 30 is greater than the diameter of the aperture 52 within the channel 50.

As illustrated in FIG. 3, the bonding surface 34 may be slanted or angled, such that when the portion of the bonding surface 34 proximate to the cover portion 32 is in contact with the hose 10, a gap remains between the portion of the bonding surface 34 distal from the cover portion 32 and the hose 10. As the runners are pressed against the hose 10, the adhesive flows into the gap and away from the band 22 and the screw mechanism.

The cover bracket 30 can be formed from any suitable material; for example, it may be metallic, non-metallic, plastic, etc. The cover bracket 30 is formed from a hard plastic, and, still more particularly it is formed from an extrusion molded plastic such as nylon or high-density polyethylene (HDPE).

A variety of adhesives or glues may be used to secure the cover bracket 30 to the hose 10. One useful glue is a cyanoacrylate. Preferably an adhesive or glue is selected which cures rapidly to facilitate assembly of the cover bracket 30 and the clamp with the hose 10.

In the illustrated embodiment, the inside spacing of the sidewalls 42 is approximately equal to the width of the clamp 20. To assemble the clamp with the hose, the clamp 20 is placed over the end of the hose in the position in which the screw is accessible for installation. The cover bracket 30 is placed over the screw housing 26 with the adhesive deposits 36 on the runners 38 and 40 in contact with the outer surface of the hose 10. As the cover bracket 30 is pressed into place, any excess adhesive flows into the channels 50 or away from the screw mechanism due to the angled bonding surface of the runners. The cover bracket 30 is held in place, for example using a clamp, until the adhesive hardens.

In an alternate embodiment, the clamp may be assembled with the hose by placing the clamp 20 over the end of the hose in the position in which the screw is accessible for installation. The cover bracket 30 is placed over the screw housing 26. Adhesive 26 may be inserted through the apertures 52 such that the adhesive is between the runners 38 and 40 and the outer surface of the hose. As the cover bracket 30 is pressed into place, any excess adhesive flows into the channels 50 or away from the screw mechanism due to the angled bonding surface of the runners. The cover bracket 30 is held in place, for example using a clamp, until the adhesive hardens.

Those skilled in the art will recognize that the cover bracket of the invention is useful in any application in which it may be desirable to supply a clamp affixed to a hose. The hose may be a fuel fill hose, radiator hose, heater hose, etc.

Having described the invention in detail and by reference to specific embodiments thereof, it will be apparent that numerous modifications and variations are possible without departing from the spirit and scope of the following claims.

What is claimed is:

1. A clamp and hose assembly comprising:
   a hose,
   a clamp including a band and a screw housing mounted to said band with a screw disposed in said screw housing, said screw engaging said band for tightening said band on said hose;
   a cover bracket having an opening receiving said screw housing, said cover bracket including a cover portion for the screw housing and a base portion extending from the cover portion, said base portion comprising a pair of runners spaced apart by said opening, each runner including an inner edge adjacent to said opening and defining a portion of the opening's length, an outer edge distal to said opening, a bonding surface proximal the outer edge, and at least one channel between the bonding surface and the inner edge, said channel being in said runner and spaced a distance from said inner edge, said inner edges of said pair of runners positioned facing one another across said opening that spaces apart the pair of runners; and
   an adhesive applied to the bonding surface.

2. The assembly of claim 1 wherein the runners are curved.

3. The assembly of claim 2 wherein the curvature of the runners is approximately the same curvature as the hose.

4. The assembly of claim 1 wherein the cover portion has an inverted U-shaped cross-section.

5. The assembly of claim 1 wherein the cover portion includes an inside surface having an inset that retains the screw housing within the cover portion when the screw is operated.

6. The assembly of claim 1 wherein the bonding surface of each runner is angled, such that when the bonding surface is pressed against the hose the adhesive is forced outwardly away from the screw and screw housing.

7. The assembly of claim 1 wherein at least one channel of each runner includes an aperture, such that when the adhesive fills the channel, the adhesive is directed through the aperture without interfering with the screw or screw housing.

8. The assembly of claim 1 wherein the cover is made from nylon or high-density polyethylene (HDPE).

9. A cover bracket for attaching a clamp having a screw and screw housing to a hose, the cover bracket comprising:
   a cover portion having a first sidewall, a second sidewall opposite the first sidewall, and an opening between and running the length of the first and second sidewalls to receive the screw housing;
   a base portion comprising a first runner and a second runner spaced apart by the opening, wherein the first runner extends from the first sidewall of the cover portion and the second runner extends from the second sidewall of the cover portion, wherein the first and second runners include opposing inner edges across said opening, said inner edges lie adjacent to and along said opening, an outer edge distal to said opening, and a bonding surface proximal the outer edge, wherein at least one of the first runner and second runner includes a channel between the bonding surface and the inner edge and an adhesive applied to the bonding surface, said channel being in said runner and spaced a distance from said inner edge.

10. The cover bracket of claim 9 wherein the runners are curved.

11. The cover bracket of claim 9 wherein the cover portion has an inverted U-shaped cross-section.

12. The cover bracket of claim 9 wherein the cover portion includes an inside surface having an inset that retains the screw housing within the cover portion when the screw is operated.

13. The assembly of claim 9 wherein the bonding surface of each runner is angled, such that when the bonding surface is pressed against the hose the adhesive is forced outwardly away from the screw and screw housing.

14. The cover bracket of claim 9 wherein at least one channel of each runner includes an aperture, such that when the adhesive fills the channel the adhesive is directed through the aperture without interfering with the screw or screw housing.

15. The cover bracket of claim 9 wherein the bracket is made from nylon or HDPE.

* * * * *